US011982562B2

United States Patent
Larsson

(10) Patent No.: US 11,982,562 B2
(45) Date of Patent: May 14, 2024

(54) RADAR LEVEL GAUGE SYSTEM WITH IMPROVED HEAT DISSIPATION

(71) Applicant: Rosemount Tank Radar AB, Mölnlycke (SE)

(72) Inventor: Stig Larsson, Sävedalen (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 457 days.

(21) Appl. No.: 17/417,164

(22) PCT Filed: Feb. 7, 2019

(86) PCT No.: PCT/EP2019/053028
§ 371 (c)(1),
(2) Date: Jun. 22, 2021

(87) PCT Pub. No.: WO2020/160777
PCT Pub. Date: Aug. 13, 2020

(65) Prior Publication Data
US 2022/0074783 A1      Mar. 10, 2022

(51) Int. Cl.
*G01F 23/284*    (2006.01)
*G01S 13/88*     (2006.01)
(Continued)

(52) U.S. Cl.
CPC .......... *G01F 23/284* (2013.01); *G01S 13/88* (2013.01); *H01Q 1/002* (2013.01); *H01Q 1/225* (2013.01)

(58) Field of Classification Search
CPC .... G01F 23/284; G01F 25/0061; G01F 25/20; G01S 13/885; G01S 13/08; G01S 13/88;
(Continued)

(56) References Cited

U.S. PATENT DOCUMENTS 5,851,083 A   12/1998  Palan
7,952,514 B2   5/2011  Nilsson
(Continued)

FOREIGN PATENT DOCUMENTS

CN       208595947 U  *  3/2019  .......... G01F 23/284
DE   102016124982 A1     6/2018

OTHER PUBLICATIONS

European International Search Report and Written Opinion for International Application No. PCT/EP2019/053028, dated Sep. 30, 2019, 10 pages.
(Continued)

*Primary Examiner* — Vladimir Magloire
*Assistant Examiner* — Michael W Justice
(74) *Attorney, Agent, or Firm* — Westman, Champlin & Koehler, P.A.

(57) ABSTRACT

A radar level gauge system include a transceiver; an antenna; a hollow waveguide for guiding the transmit signal from a first end facing the transceiver towards a second end facing the antenna; a housing including a heat-dissipating structure arranged at a first distance from the second end; a first thermal connection between the hollow waveguide and the heat-dissipating structure; and a second thermal connection between the hollow waveguide and the housing arranged at a second distance, shorter than the first distance, from the second end. The first and second thermal connection are arranged such that a thermal resistance of a first heat conduction path from the second end of the hollow waveguide through the first thermal connection to the heat-dissipating structure, is lower than a thermal resistance of a second heat conduction path from the second end of the hollow waveguide through the second thermal connection to the housing.

15 Claims, 3 Drawing Sheets

(51) Int. Cl.
*H01Q 1/00* (2006.01)
*H01Q 1/22* (2006.01)

(58) Field of Classification Search
CPC ........ G01S 7/027; H01Q 1/225; H01Q 1/002;
H01Q 13/02
USPC ........................................ 342/124; 73/290 R
See application file for complete search history.

(56) References Cited

U.S. PATENT DOCUMENTS

| | | | |
|---|---|---|---|
| 8,477,064 B2 | 7/2013 | Nilsson | |
| 8,688,279 B2 | 4/2014 | Nilsson et al. | |
| 8,970,395 B2 | 3/2015 | Nilsson et al. | |
| 11,047,725 B2* | 6/2021 | Ohlsson | G01S 13/88 |
| 11,187,570 B2* | 11/2021 | Feisst | G01F 23/284 |
| 2011/0093129 A1 | 4/2011 | Nilsson et al. | |
| 2012/0186339 A1* | 7/2012 | Feisst | G01S 13/88 |
| | | | 73/290 V |
| 2014/0002274 A1 | 1/2014 | Nilsson et al. | |
| 2019/0331518 A1* | 10/2019 | Ohlsson | G01F 23/284 |
| 2019/0372449 A1* | 12/2019 | Mills | C01B 3/00 |
| 2020/0088562 A1* | 3/2020 | Feisst | G01S 13/88 |

OTHER PUBLICATIONS

Application and Drawings for U.S. Appl. No. 12/603,048, filed Oct. 21, 2009, 15 pages.
Application and Drawings for U.S. Appl. No. 13/537,513, filed Jun. 29, 2012, 31 pages.

* cited by examiner

RADAR LEVEL GAUGE SYSTEM WITH IMPROVED HEAT DISSIPATION

CROSS-REFERENCE TO RELATED APPLICATION

This Application is a Section 371 National Stage Application of International Application No. PCT/EP2019/053028, filed Feb. 7, 2019 and published as WO 2020/160777 A1 on Aug. 13, 2020, in English, the entire contents of which are hereby incorporated by reference in their entireties.

TECHNICAL FIELD OF THE INVENTION

The present invention relates to a radar level gauge system for determining a filling level of a product in a tank.

TECHNICAL BACKGROUND

Radar level gauge (RLG) systems are in wide use for determining the filling level of a product contained in a tank. In a radar level gauge system, an electromagnetic transmit signal is generated by a transceiver and propagated towards the surface of the product in the tank, and an electromagnetic reflection signal resulting from reflection of the transmit signal at the surface is propagated back towards to the transceiver.

Based on a relation between the transmit signal and the reflection signal, the distance to the surface of the product can be determined.

In some applications for radar level gauge systems, the temperature inside the tank may, at least at times, be very high, such as 200° C. or more. Generally, the measurement electronics comprised in a radar level gauge system cannot withstand such temperatures, and measures need to be taken to keep the temperature of the measurement electronics sufficiently low.

One way in which this problem has been solved, is to arrange an adaptor made of a material having poor thermal conductivity between the tank (flange and antenna) and measurement housing. This kind of solution is described in U.S. Pat. No. 5,851,083.

The current trend is, however, towards higher measurement frequencies. Radar level gauge systems with higher measurement frequencies, such as 79 GHz or higher, are more compact than radar level gauge systems with lower measurement frequencies, and it may not be convenient to arrange an adaptor of the kind described in U.S. Pat. No. 5,851,083.

Another approach is described in DE 10 2016 124 982, where the housing neck is made of a material having a high heat conductivity, and the measurement electronics is arranged inside the housing neck. To prevent the housing neck from transporting heat to the measurement electronics, the inner surface of the housing neck is covered with thermal insulation, and the waveguide between the measurement electronics and the antenna is divided into an upper part and a lower part. Between the upper part and the lower part, a thermally insulating material is provided.

It would be desirable to provide an improved radar level gauge system, in particular a heat-resistant radar level gauge system that may be easier to assemble, and that may be made more compact.

SUMMARY

In view of the above, a general object of the present invention is to provide an improved heat-resistant radar level gauge system.

According to a first aspect of the present invention, it is therefore provided a radar level gauge system for determining a filling level of a product in a tank, comprising: a transceiver for generating, transmitting and receiving electromagnetic signals; an antenna for radiating an electromagnetic transmit signal from the transceiver towards a surface of the product and for returning an electromagnetic reflection signal resulting from reflection of the electromagnetic transmit signal at the surface back towards the transceiver; a hollow waveguide for guiding the transmit signal in a signal propagation direction from a first end of the hollow waveguide facing the transceiver towards a second end of the hollow waveguide facing the antenna; a housing enclosing at least the transceiver and the hollow waveguide, the housing including a heat-dissipating structure arranged at a first distance, in the signal propagation direction, from the second end of the hollow waveguide; a first thermal connection between the hollow waveguide and the heat-dissipating structure; and a second thermal connection between the hollow waveguide and the housing arranged at a second distance, in the signal propagation direction, from the second end of the hollow waveguide, the second distance being shorter than the first distance, the first thermal connection and the second thermal connection being dimensioned and arranged in such a way that a thermal resistance of a first heat conduction path from the second end of the hollow waveguide through the first thermal connection to the heat-dissipating structure, is lower than a thermal resistance of a second heat conduction path from the second end of the hollow waveguide through the second thermal connection to the housing.

The heat-dissipating structure may be any structure capable of effectively conducting and dissipating heat. Accordingly, the heat-dissipating structure may advantageously be made of a suitable metal having a relatively high heat conductivity, such as Aluminum or Copper. However, depending on the dimensioning and configuration of the radar level gauge system, other materials may be suitable as well. For instance, the heat-dissipating structure may be made of a metal having a lower heat conductivity, such as stainless steel. Furthermore, the heat-dissipating structure may be a separate component, or an integral portion of the housing of the radar level gauge system.

It should be understood that the first heat conduction path is the heat conduction path having the lowest thermal resistance of all possible heat conduction paths from the second end of the hollow waveguide, through the first thermal connection to the heat-dissipating structure. In the same way, the second heat conduction path is the heat conduction path having the lowest thermal resistance of all possible heat conduction paths from the second end of the hollow waveguide through the second thermal connection to the housing.

The "transceiver" may be one functional unit capable of transmitting and receiving electromagnetic signals, or may be a system comprising separate transmitter and receiver units.

It should be noted that the processing circuitry may be provided as one device or several devices working together.

The electromagnetic transmit signal may advantageously be a microwave signal. For instance, the transmit signal may be frequency and/or amplitude modulated on a carrier in the microwave frequency range.

An example center frequency of the electromagnetic transmit signal may be at least 60 GHz. For example, the center frequency may be about 80 GHz.

The present invention is based on the realization that the hollow waveguide guiding the transmit signal from the transceiver (the measurement electronics) to the antenna is a key structural component in the heat transfer from the inside of the tank to the transceiver. Based on this insight, the present inventor has realized that the heat transport through the hollow waveguide to the transceiver can be reduced by limiting the flow of heat from the tank to the waveguide at the second (typically lower) end of the waveguide, and facilitating the flow of heat from the second (typically lower) end of the waveguide to a heat-dissipating structure closer to the first end (typically upper) end of the waveguide.

Simulations have shown that these measures can significantly reduce the temperature at the transceiver, even for very high temperatures inside the tank. Such high temperatures may, for example, be present in connection with cleaning of the tank (including the antenna of the radar level gauge system) for hygiene applications.

According to embodiments, the thermal resistance of the first heat conduction path may be less than half the thermal resistance of the second heat conduction path.

Advantageously, the first distance from the second end of the hollow waveguide may be at least 50 mm. This may particularly be the case for embodiments in which the housing is metallic. At such a distance from the tank, the temperature of the housing and/or the heat-dissipating structure may be sufficiently low for efficient heat conduction from the second end of the hollow waveguide to the heat-dissipating structure.

According to various embodiments, the radar level gauge system may further comprise a thermal conduction structure arranged between the hollow waveguide and the housing, at the first distance from the second end, to at least partly form the first thermal connection.

The thermal conduction structure may be integrally formed with the hollow waveguide or it may be a separate component. The thermal conduction structure may be made of a material having a relatively high heat conductivity, such as a suitable metal. Alternatively, the thermal conduction structure may be made of a non-metallic material having a relatively high heat conductivity.

In embodiments of the radar level gauge system according to the present invention, the temperature gradients between different positions may be rather big, at least partly due to the heat conduction properties of the radar level gauge system according to embodiments of the invention. Furthermore, different parts of the radar level gauge system may be made of different materials, having different coefficients of thermal expansion. To prevent unwanted disruptions in the signal path from the transceiver to the antenna, the thermal conduction structure may be spring-loaded in the propagation direction towards the hollow waveguide.

In embodiments, the radar level gauge system may further comprise a thermal insulation structure arranged between the hollow waveguide and the housing, at the second distance from the second end, to at least partly form the second thermal connection. Through the provision of such a thermal insulation structure, the thermal resistance of the second heat conduction path can be increased.

This thermal insulation structure may advantageously be made of a dielectric material, and may serve to provide the additional function of electrical separation.

According to embodiments, the antenna may comprise a dielectric antenna body having a transmit signal receiving surface to receive the transmit signal from the second end of the hollow waveguide.

The dielectric antenna body may be made of any suitable dielectric material. One example of such a suitable dielectric material may be PTFE (polytetrafluoroethylene). As one of ordinary skill in the art of radar level gauging will be aware, there are many other suitable dielectric materials that may be preferable to use in the antenna body, depending on the application.

A portion of the dielectric antenna body may be arranged between the second end of the hollow waveguide and the housing to at least partly form the second thermal connection.

In embodiments, the dielectric antenna body may be arranged to separate the second end of the hollow waveguide and the housing by at least 0.5 mm of dielectric antenna body material.

The dielectric antenna body may have a recess, and the second end of the hollow waveguide may be at least partly arranged in the recess.

The second end of the hollow waveguide facing the transmit signal receiving surface may advantageously be in direct abutment with the transmit signal receiving surface of the dielectric antenna body. In this manner, the dielectric antenna body can synergistically fulfil the dual function of accurately positioning the hollow waveguide in relation to the dielectric antenna body, and provide thermal insulation between the second end of the hollow waveguide and the housing.

According to various embodiments, furthermore, the hollow waveguide may comprise a flaring portion at the second end of the hollow waveguide. The flaring portion may act as a horn to provide a gradual impedance transition between the hollow waveguide and the antenna.

In summary, the present invention thus relates to a radar level gauge system comprising a transceiver; an antenna; a hollow waveguide for guiding the transmit signal from a first end facing the transceiver towards a second end facing the antenna; a housing including a heat-dissipating structure arranged at a first distance from the second end; a first thermal connection between the hollow waveguide and the heat-dissipating structure; and a second thermal connection between the hollow waveguide and the housing arranged at a second distance, shorter than the first distance, from the second end. The first thermal connection and the second thermal connection are dimensioned and arranged in such a way that a thermal resistance of a first heat conduction path from the second end of the hollow waveguide through the first thermal connection to the heat-dissipating structure, is lower than a thermal resistance of a second heat conduction path from the second end of the hollow waveguide through the second thermal connection to the housing.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF EXAMPLE EMBODIMENTS OF THE INVENTION

In the present detailed description, various embodiments of the radar level gauge system according to the present invention are mainly discussed with reference to a battery-powered radar level gauge system with wireless communication capabilities.

It should be noted that this by no means limits the scope of the present invention, which equally well includes, for example, radar level gauge systems that are not included in a process management system or radar level gauge systems that are loop-powered or powered with dedicated power lines.

Figure 1:
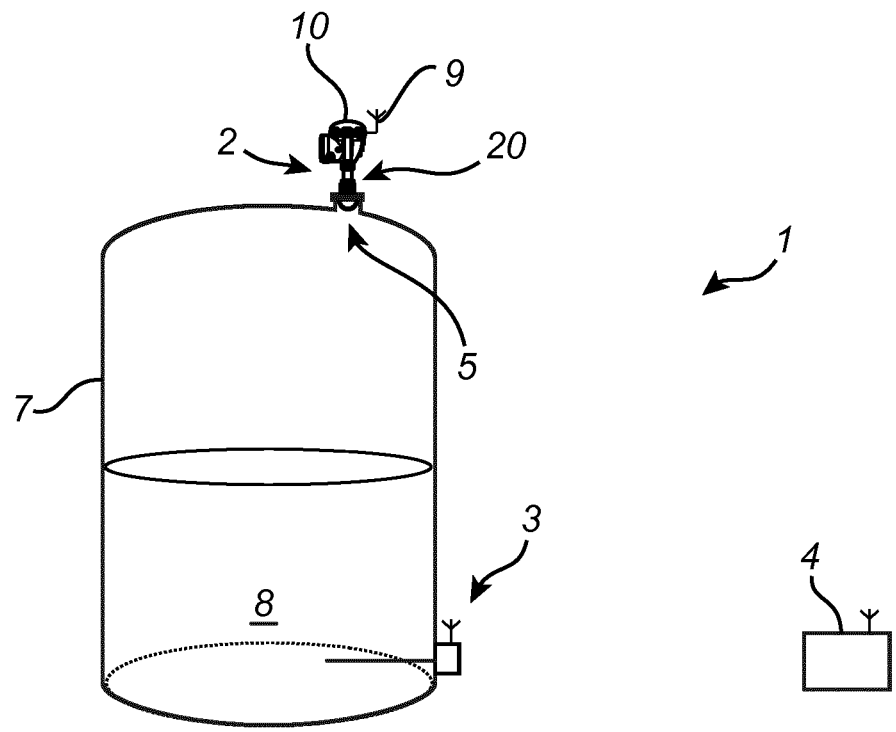
FIG. 1 schematically shows a process monitoring system comprising a radar level gauge system according to an example embodiment of the present invention.

FIG. 1 schematically shows a process monitoring system 1 comprising a plurality of field devices, including an example embodiment of a radar level gauge system 2 and a temperature sensing device 3 wirelessly connected to a host system 4. The radar level gauge system 2 comprises a measurement electronics unit 10 arranged on an outside of the tank 7, an antenna arrangement 5 at least partly arranged on an inside the tank 7, and a feed-through 20 connecting the measurement electronics unit 10 with the antenna arrangement 5.

The radar level gauge system 2 and the temperature sensor 3 are both arranged on a tank containing a product 8 to be gauged.

To reduce the energy consumption of the radar level gauge system 2, at least parts of the radar level gauge system may be operated intermittently and energy may be stored during inactive or idle periods to be used during active periods.

Solutions for intermittent operation and energy storage are, for example, described in U.S. Pat. Nos. 7,952,514, 8,477,064 and U.S. Ser. No. 12/603,048, each of which is hereby incorporated by reference in its entirety.

Figure 2:
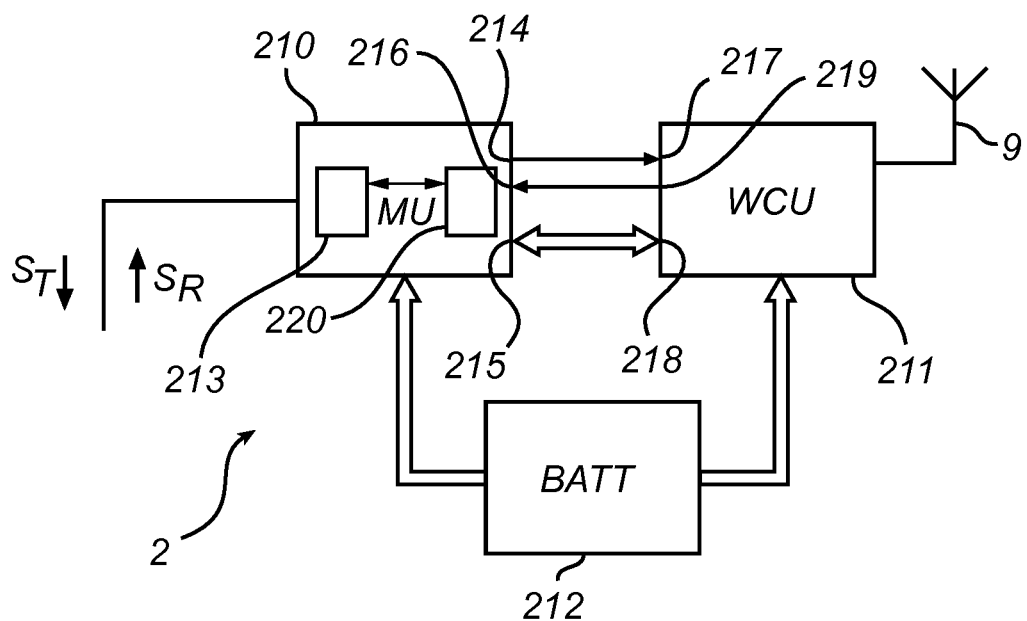
FIG. 2 is a block diagram schematically illustrating the radar level gauge system in FIG. 1.

With reference to FIG. 2, the radar level gauge system 2 in FIG. 1 comprises a measurement unit (MU) 210, a wireless communication unit (WCU) 211 and a local energy store in the form of a battery 212. The wireless communication unit 211 may advantageously be compliant with WirelessHART (IEC 62591). As is schematically indicated in FIG. 2, the MU 210 comprises a transceiver 213 and a measurement processor 220. The transceiver 213 is controllable by the measurement processor 220 for generating, transmitting and receiving electromagnetic signals having frequencies defining a frequency bandwidth. the measurement processor 220 is coupled to the transceiver 213 for determining the filling level in the tank 7 based on a relation between the transmit signal S T and the reflection signal $S_R$.

As is schematically indicated in FIG. 2, the measurement unit 210 comprises a first output 214, a second output 215, and a first input 216. The first output 214 is connected to a first input 217 of the wireless communication unit 211 through a first dedicated discreet line, the second output 215 is connected to a second input 218 of the wireless communication unit 211, and the first input 216 is connected to a first output 219 of the wireless communication unit 211 through a second dedicated discreet line. The second output 215 of the measurement unit 210 and the second input 218 of the wireless communication unit 211 may be configured to handle bidirectional data communication according to a serial or a parallel communication protocol to allow exchange of data between the measurement unit 210 and the wireless communication unit 211. The communication between the measurement unit 210 and the wireless communication unit 211 using the different inputs/outputs is described in more detail in U.S. patent application Ser. No. 13/537,513, which is hereby incorporated by reference in its entirety.

The above example of a wireless and locally powered configuration is intended to give the skilled person a detailed example of how various aspects and embodiments of the radar level gauge system according to the present invention can be implemented. It should, however, be noted that there are many other ways of powering and interfacing a radar level gauge system. Such other ways are widely accessible to one of ordinary skill in the art and can be implemented without excessive experimentation or undue burden.

Figure 3:
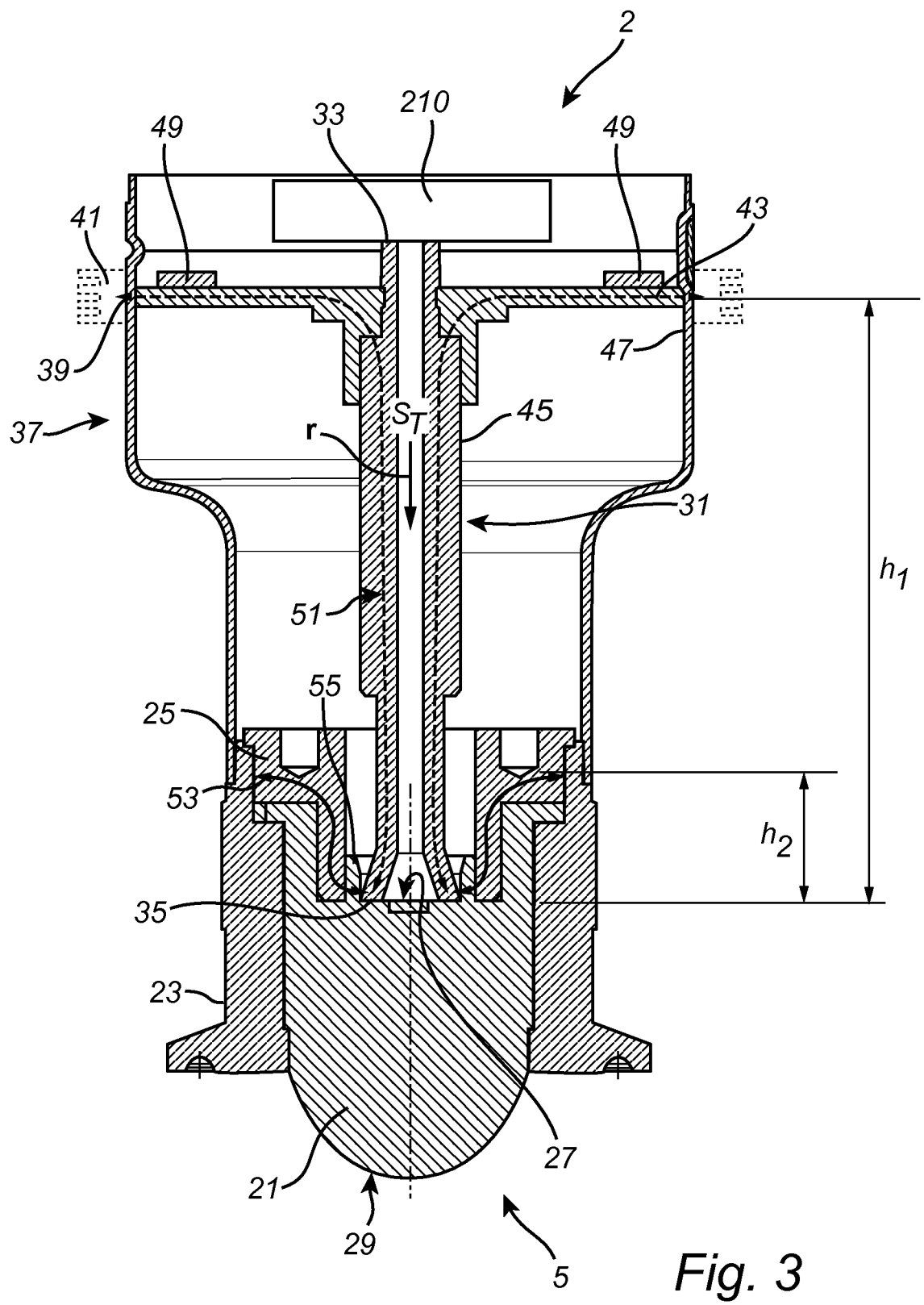
FIG. 3 is a schematic partial cross-section view of a first embodiment of the radar level gauge system in FIG. 1.

FIG. 3 is a partial cross-section view of a first embodiment of the radar level gauge system 2 in FIG. 1. Referring to FIG. 3, the radar level gauge system 2 comprises measurement unit 210, including the transceiver 213 and the measurement processor 220, and antenna arrangement 5. The above-mentioned wireless communication unit 211 and battery 212 are not shown in FIG. 3.

Referring to FIG. 3, the antenna arrangement 5, in this first embodiment, comprises dielectric antenna body 21, an antenna housing 23, and a retainer 25 for securely holding the dielectric antenna body 21 in place inside the antenna housing 23. As can be seen in FIG. 3, the dielectric antenna body 21 has a transmit signal receiving surface 27, and a convex transmit signal emitting surface 29, facing the interior of the tank.

The radar level gauge system 2 in FIG. 3 further comprises a hollow waveguide 31 with a first end 33 facing the transceiver comprised in the measurement unit 210, and a second end 35 facing the antenna arrangement 5. The hollow waveguide 31 guides the transmit signal $S_T$ generated by the transceiver in a signal propagation direction r indicated by the arrow inside the hollow waveguide 31 in FIG. 3.

A housing 37 encloses at least the measurement unit 210 and the hollow waveguide 31. The housing 37 includes a heat-dissipating structure arranged at a first distance $h_1$, in a direction parallel to the signal propagation direction r from the second end 35 of the hollow waveguide 31. Depending on, for instance, the heat dissipation requirements and the heat conduction properties of the housing 37 between the antenna housing 23 and the heat-dissipating structure, the heat-dissipating structure may be a portion 39 of the housing 37, or a separate structure, such as the cooling flange 41 schematically indicated with dashed lines in FIG. 3. If, for instance, the housing is made of a metal, such as stainless steel, the desired functionality of the heat-dissipating structure may be fullfilled by a portion 39 of the housing, and if the housing is made of plastic, for example, a separate metallic heat-dissipating structure 41 may be provided.

The radar level gauge system 2 comprises a first thermal connection between the hollow waveguide 31 and the heat-dissipating structure 39. the radar level gauge system 2 in FIG. 3, the thermal connection is at least partly formed by a thermal conduction structure 43. In the radar level gauge system 2 in FIG. 3, the thermal conduction structure 43 is provided in the form of a substantially circular metal plate, which is in direct contact with an outer surface 45 of the hollow waveguide 31, and with the heat-dissipating structure, such as an inner surface 47 of the housing 37 at the first distance h 1 from the second end 35 of the hollow waveguide 31. As is schematically indicated in FIG. 3, the thermal conduction structure 43 may be urged towards the hollow waveguide 31 by spring 49, to prevent the formation of an airgap along the signal propagation path, such as between the second end 35 of the hollow waveguide 31 and the signal receiving surface 27 of the dielectric antenna body 21.

Further, the radar level gauge system 2 comprises a second thermal connection between the hollow waveguide 31 and the housing 37 arranged at a second distance h 2 from the second end 35 of the hollow waveguide 31. As can be seen in FIG. 2, the second distance $h_2$ is shorter than the above-mentioned first distance $h_1$.

In the radar level gauge system 2 in FIG. 3, the above-described first thermal connection and second thermal connection are dimensioned and arranged in such a way that a thermal resistance $R_1$ of a first heat conduction path 51 (schematically indicated with a dashed line through the hollow waveguide 31 and the thermal conduction structure 43) from the second end 35 of the hollow waveguide 31 to the heat-dissipating structure 39 (41), is lower than a thermal resistance $R_2$ of a second heat conduction path 53 (schematically indicated with a solid line in FIG. 3) from the second end 35 of the hollow waveguide 31 through the second thermal connection to the housing 37.

As was mentioned in the Summary section further above, the first heat conduction path 51 is the heat conduction path from the second end 35 of the hollow waveguide 31, through the first thermal connection, to the heat-dissipating structure 39 (41) having the lowest thermal resistance $R_1$, and the second heat conduction path 53 is the heat conduction path from the second end 35 of the hollow waveguide 31, through the second thermal connection, to the housing 37 having the lowest thermal resistance $R_2$.

In the embodiment in FIG. 3, the first heat conduction path 51 goes through metal or another material with a high heat conductivity substantially all the way from the second end 35 of the hollow waveguide 31 to the heat-dissipating structure 39 (41) at the above-mentioned first distance $h_1$ from the second end 35 of the hollow waveguide. For the configuration of the radar level gauge system 2 in FIG. 3, the thermal resistance $R_1$ of the first heat conduction path 51 may typically be around 8 K/W.

The second heat conduction path 53 goes through a thermal insulation structure arranged between the second end 35 of the hollow waveguide 31 and the housing 37. In the first embodiment of the radar level gauge system 2 in FIG. 3, the thermal insulation structure is constituted by a wall portion 55 of the dielectric antenna body 21, which performs the additional function of defining the alignment of the hollow waveguide 31 in relation to the dielectric antenna body 21. The main contribution to the thermal resistance $R_2$ of the second heat conduction path 53 is provided by the wall portion 55 of the dielectric antenna body 21, since the rest of the second heat conduction path 53 goes through metal. For the configuration of the radar level gauge system 2 in FIG. 3, the thermal resistance $R_2$ of the second heat conduction path 53 may typically be around 33 K/W.

Because of the relatively high thermal resistance $R_2$ of the second heat conduction path 53, relatively close to the tank, and the relatively low thermal resistance $R_1$ of the first heat conduction path 51, relatively far away from the tank, heat from the tank is efficiently drained away to the heat-dissipating structure 39 (41). Hereby, the temperature of the heat-sensitive electronics in the measurement unit 210 can be kept down, such as below 80° C., even when the temperature in the tank is very high, such as around 200° C.

Figure 4:
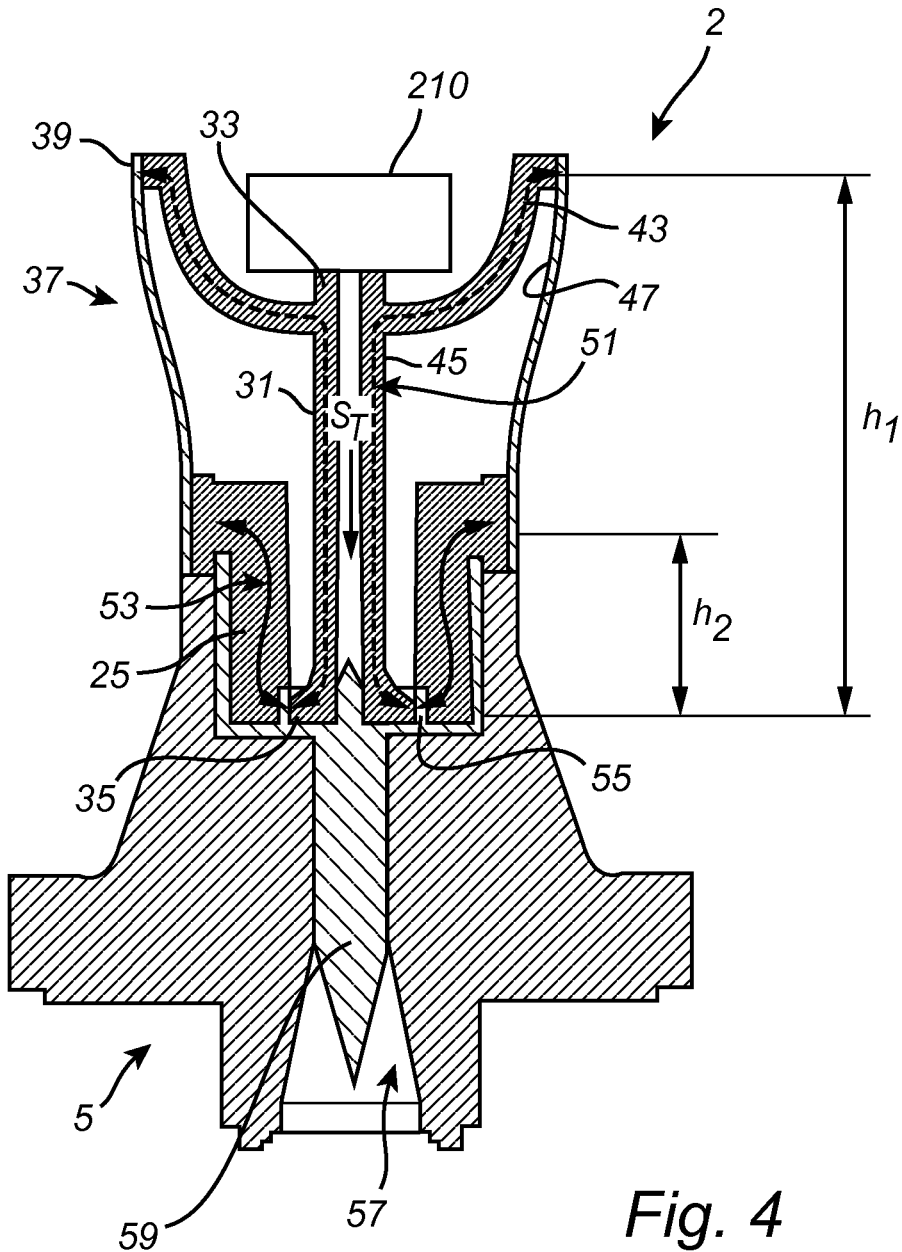
FIG. 4 is a schematic partial cross-section view of a second embodiment of the radar level gauge system in FIG. 1.

FIG. 4 is a partial cross-section view of a second embodiment of the radar level gauge system 2 in FIG. 1. As is evident from a comparison of FIG. 3 and FIG. 4, the second embodiment mainly differs from the first embodiment in the configuration of the antenna arrangement 5.

Referring to FIG. 4, the antenna arrangement 5, in this second embodiment, comprises a metallic horn antenna 57 with a dielectric plug 59 inserted therein from above. The upper portion of the dielectric plug 59 is "bucket" shaped for leakage prevention, and has a wall portion 55 defining the alignment of the hollow waveguide 31 in relation to the horn antenna 57.

The first 51 and second 53 heat conduction paths in the second embodiment of the radar level gauge system 2 in FIG. 4 are similar to the corresponding heat conduction paths described above for the first embodiment of the radar level gauge system 2 in FIG. 3.

The person skilled in the art realizes that the present invention by no means is limited to the preferred embodiments described above. On the contrary, many modifications and variations are possible within the scope of the appended claims.

The invention claimed is:

1. A radar level gauge system for determining a filling level of a product in a tank, comprising:
   a transceiver for generating, transmitting and receiving electromagnetic signals;
   an antenna for radiating an electromagnetic transmit signal from the transceiver towards a surface of the product and for returning an electromagnetic reflection signal resulting from reflection of the electromagnetic transmit signal at the surface back towards the transceiver;
   a hollow waveguide for guiding the transmit signal in a signal propagation direction from a first end of the hollow waveguide facing the transceiver towards a second end of the hollow waveguide facing the antenna;
   a housing enclosing at least the transceiver and the hollow waveguide, the housing including a heat-dissipating structure arranged at a first distance, in the signal propagation direction, from the second end of the hollow waveguide;
   a first thermal connection between the hollow waveguide and the heat-dissipating structure; and
   a second thermal connection between the hollow waveguide and the housing arranged at a second distance, in the signal propagation direction, from the second end of the hollow waveguide, the second distance being shorter than the first distance,
   the first thermal connection and the second thermal connection being dimensioned and arranged in such a way that a thermal resistance of a first heat conduction path from the second end of the hollow waveguide through the first thermal connection to the heat-dissipating structure, is lower than a thermal resistance of a second heat conduction path from the second end of the hollow waveguide through the second thermal connection to the housing.

2. The radar level gauge system according to claim 1, wherein the thermal resistance of the first heat conduction path is less than half the thermal resistance of the second heat conduction path.

3. The radar level gauge system according to claim 1, wherein the first distance from the second end of the hollow waveguide is at least 50 mm.

4. The radar level gauge system according to claim 1, wherein the radar level gauge system further comprises a thermal conduction structure arranged between the hollow waveguide and the housing, at the first distance from the second end, to at least partly form the first thermal connection.

5. The radar level gauge system according to claim 4, wherein the thermal conduction structure is in direct contact with an outer surface of the hollow waveguide.

6. The radar level gauge system according to claim 4, wherein the thermal conduction structure is in direct contact with the heat-dissipating structure.

7. The radar level gauge system according to claim 4, wherein the thermal conduction structure is spring-loaded in the propagation direction towards the hollow waveguide.

8. The radar level gauge system according to claim 1, wherein the radar level gauge system further comprises a thermal insulation structure arranged between the hollow waveguide and the housing, at the second distance from the second end, to at least partly form the second thermal connection.

9. The radar level gauge system according to claim 8, wherein the thermal insulation structure is made of a dielectric material.

10. The radar level gauge system according to claim 1, wherein the antenna comprises a dielectric antenna body having a transmit signal receiving surface to receive the transmit signal from the second end of the hollow waveguide.

11. The radar level gauge system according to claim 10, wherein a portion of the dielectric antenna body is arranged between the second end of the hollow waveguide and the housing to at least partly form the second thermal connection.

12. The radar level gauge system according to claim 11, wherein the dielectric antenna body is arranged to separate the second end of the hollow waveguide and the housing by at least 0.5 mm of dielectric antenna body material.

13. The radar level gauge system according to claim 11, wherein the dielectric antenna body has a recess, and the second end of the hollow waveguide is at least partly arranged in the recess.

14. The radar level gauge system according to claim 10, wherein the second end of the hollow waveguide is in direct abutment with the transmit signal receiving surface of the dielectric antenna body.

15. The radar level gauge system according to claim 1, wherein the hollow waveguide comprises a flaring portion at the second end of the hollow waveguide.

* * * * *